Oct. 20, 1970          F. PERNAU                3,535,536
   TIRE TREAD ANALYZER UTILIZING SCANNING OF TREAD MODEL
                  DISPOSED ON ROTATING DRUM
Filed Sept. 6, 1968
                                              5 Sheets-Sheet 1

INVENTOR
FRANZ PERNAU,

BY *[signature]*

ATTORNEY

Oct. 20, 1970  F. PERNAU  3,535,536
TIRE TREAD ANALYZER UTILIZING SCANNING OF TREAD MODEL
DISPOSED ON ROTATING DRUM
Filed Sept. 6, 1968  5 Sheets-Sheet 4

INVENTOR:
FRANZ PERNAU
BY
ATTORNEY

United States Patent Office 3,535,536
Patented Oct. 20, 1970

3,535,536
TIRE TREAD ANALYZER UTILIZING SCANNING OF TREAD MODEL DISPOSED ON ROTATING DRUM
Franz Pernau, Vienna, Austria, assignor to Semperit Osterreichisch - Amerikanische Gummiwerke AG., Vienna, Austria, a corporation of Austria
Filed Sept. 6, 1968, Ser. No. 759,821
Claims priority, application Austria, Sept. 7, 1967,
A 8,176/67
Int. Cl. G06k *11/00*
U.S. Cl. 250—219            8 Claims

ABSTRACT OF THE DISCLOSURE

A method for tire tread analyzing provides for scanning photoelectrically a tape that has a drawing of a tire tread. The apparatus has a drum that mounts the tape, a light source and a series of photosensitive elements.

---

Figure 1:
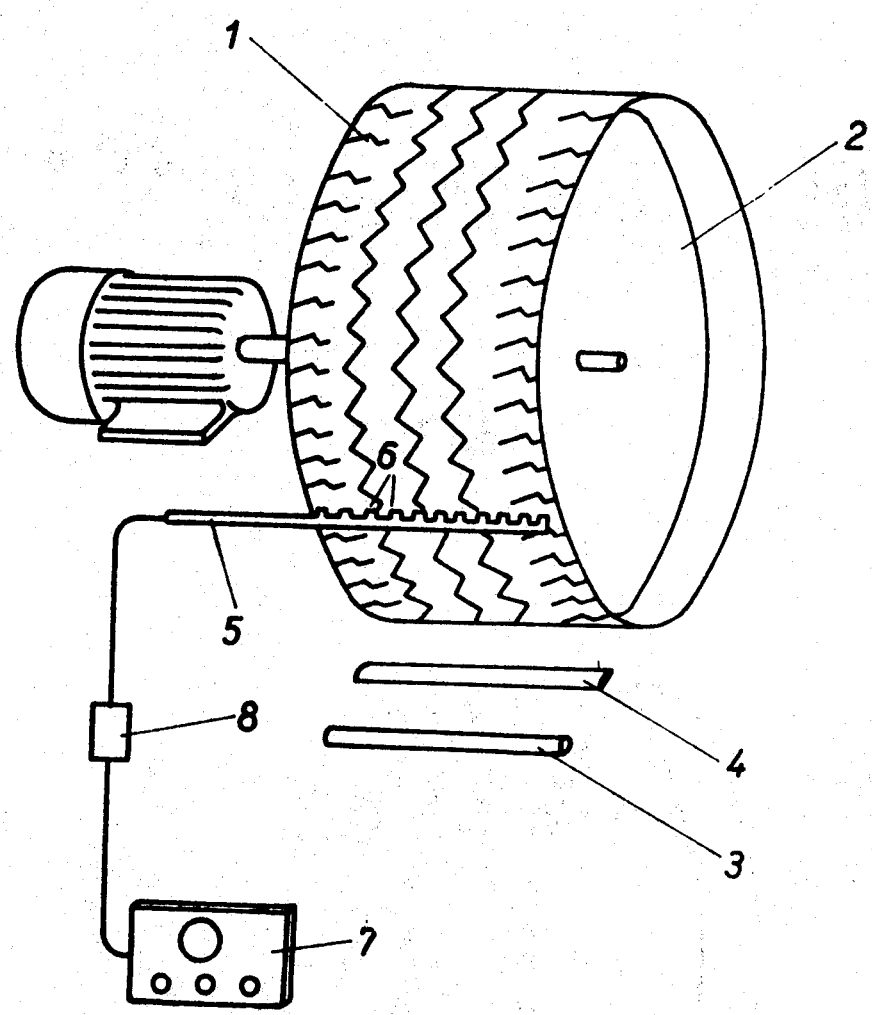

The invention relates to tires, and relates particularly to methods and apparatus for analyzing tire tread for contact noise.

When a tire rolls straight on a surface, there occurs a background noise that is caused by the rhythmic succession of impacts of the tire tread elements. The background noise includes sound mixtures which are rich in harmonics, that are heard as howling. These noises form a part of traveling discomfort which increases in importance with the development of modern transportation.

These background noises can be measured acoustically on the vehicles themselves, or on testing equipment. The composition of this background noise may be analyzed, so that it is possible by reverse calculation to determine those details of the tread that exert a disadvantageous influence on the acoustics.

Experience has shown that for judging the discomfort of a noise the distribution of the frequencies is of far greater importance than the sound volume, and certain sound ranges are characterized by being particularly obnoxious.

In order to carry out measurements of this type that will yield meaningful results, there is needed a tire tread that is produced in accordance with the normal tread production operation. The heat form necessary for producing such tire treads, however, renders this operation time consuming and very expensive.

It is, however, possible to carve out a tread from a treadless vulcanized tire. This method is faster and less expensive than the previously discussed method, but it is still costly and does not yield reliable results, as the results are impaired by faults in the carving as well as by the change in surface condition, as the outer contour can be maintained only with an individual heating form.

For preparing new tire treads, there exists therefore a need for a quicker and less expensive analyzing method, in order to select quickly desired tire treads, as long as the results are within tolerable position limits.

Optical electronic measuring methods have been proposed in the past. In all these proposals, however, the tire tread was reproduced optically photographically on a straight film strip or on a round plate, at a reduced scale, and the scanning was carried out with a single photoelectric cell, and the light was transmitted through the film strip or plate. The production of such a model carrier in microscale, the models having a width of about 5 mm., was time-consuming, complicated and unprecise, and furthermore this method did not permit the analysis of particular portions of the model, as is sometimes required for a better orientation.

It is accordingly among the principal objects of the invention to provide a method and apparatus for analyzing tire treads that avoids the drawbacks of the prior art, yields reliable results, in an inexpensive and quick operation.

Further objects and advantages of the invention will be set forth in part in the following specification and in part will be obvious therefrom without being specifically referred to, the same being realized and attained as pointed out in the claims hereof.

Generally, these aims are achieved by the instant invention by providing an optical electronic measuring method in which a model tape with a graphically drawn tire tread design is scanned by a photoelectric exploring system. The tire tread design preferably includes color contrasts, such as black and white areas. The impulses obtained by the photoelectric exploring system are converted into acoustical or optical signals and/or are recorded. The black and white drawing is preferred as it provides for the necessary contrast, and either the rolling surface or the groove may be covered with the color, for instance black. The light intensity then has a periodic characteristic similar to the contact characteristics between the tire and the road surface.

The controlled light ray will impinge upon the photosensitive element, such as photo cells or photo resistances, which convert the light impulses into corresponding electric signals. These signals after amplification will either directly be fed into an amplifier or be measured in a frequency analyzer.

Opaque model tapes, as well as opaque mounts, such as a drum for the model tape, may be produced easily and at low cost. It is therefore preferable to use a reflected light system, that gives sufficient light when using halogen lamps as a light source.

Figure 2A:
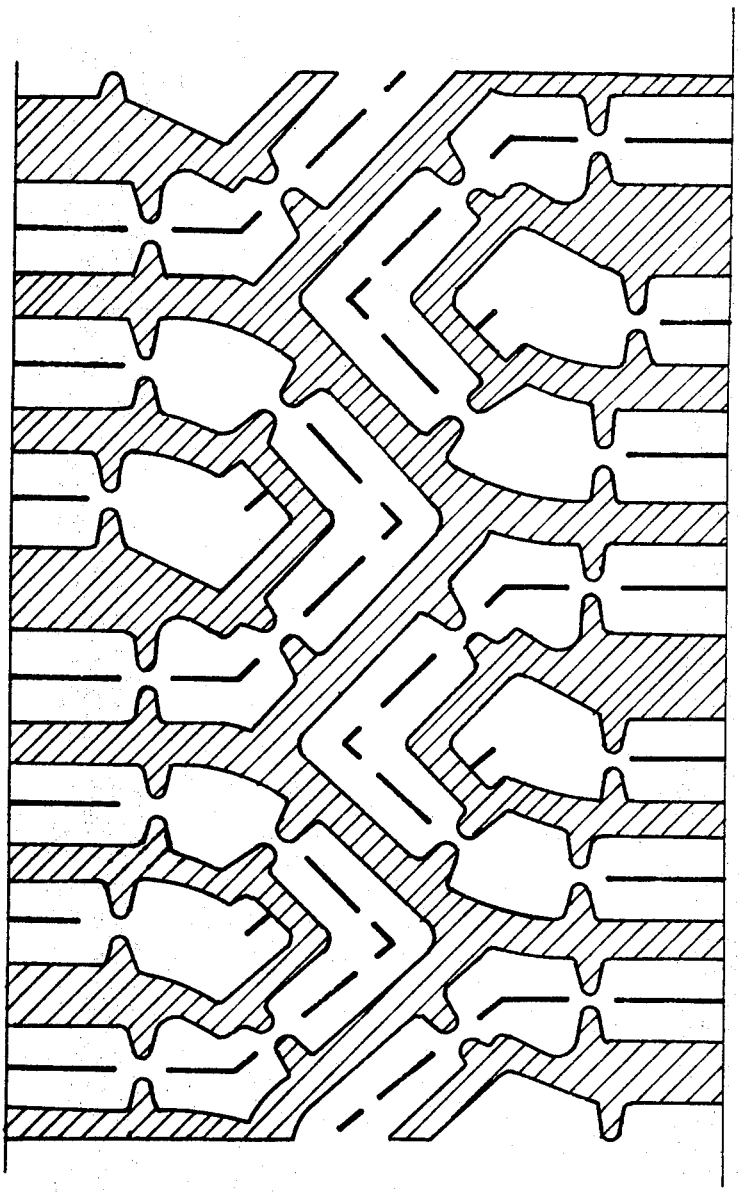
Figure 2B:
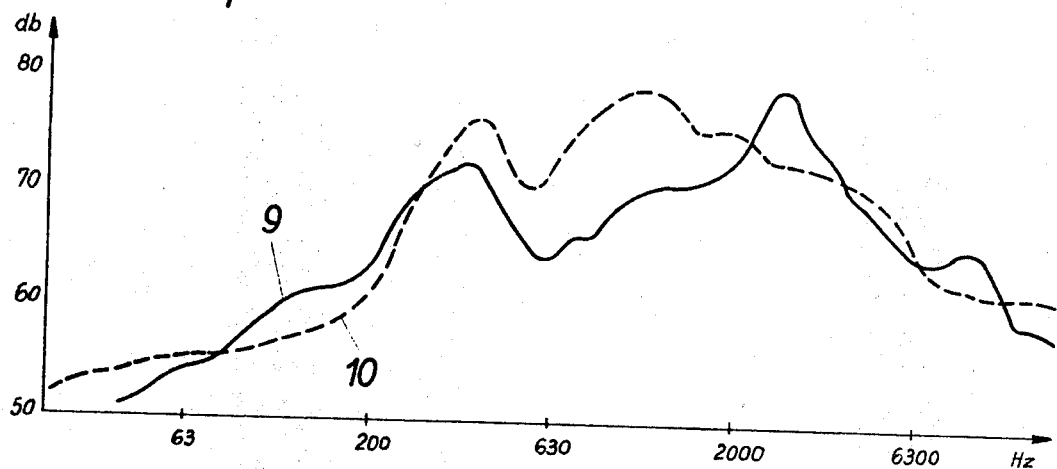
Figure 2C:
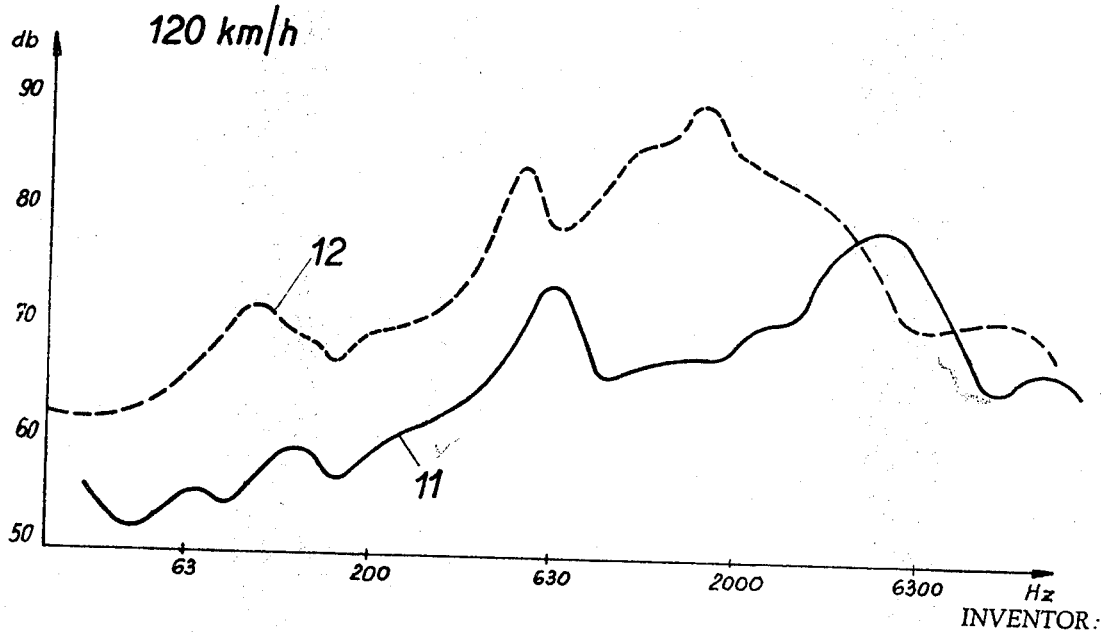
Figure 3A:
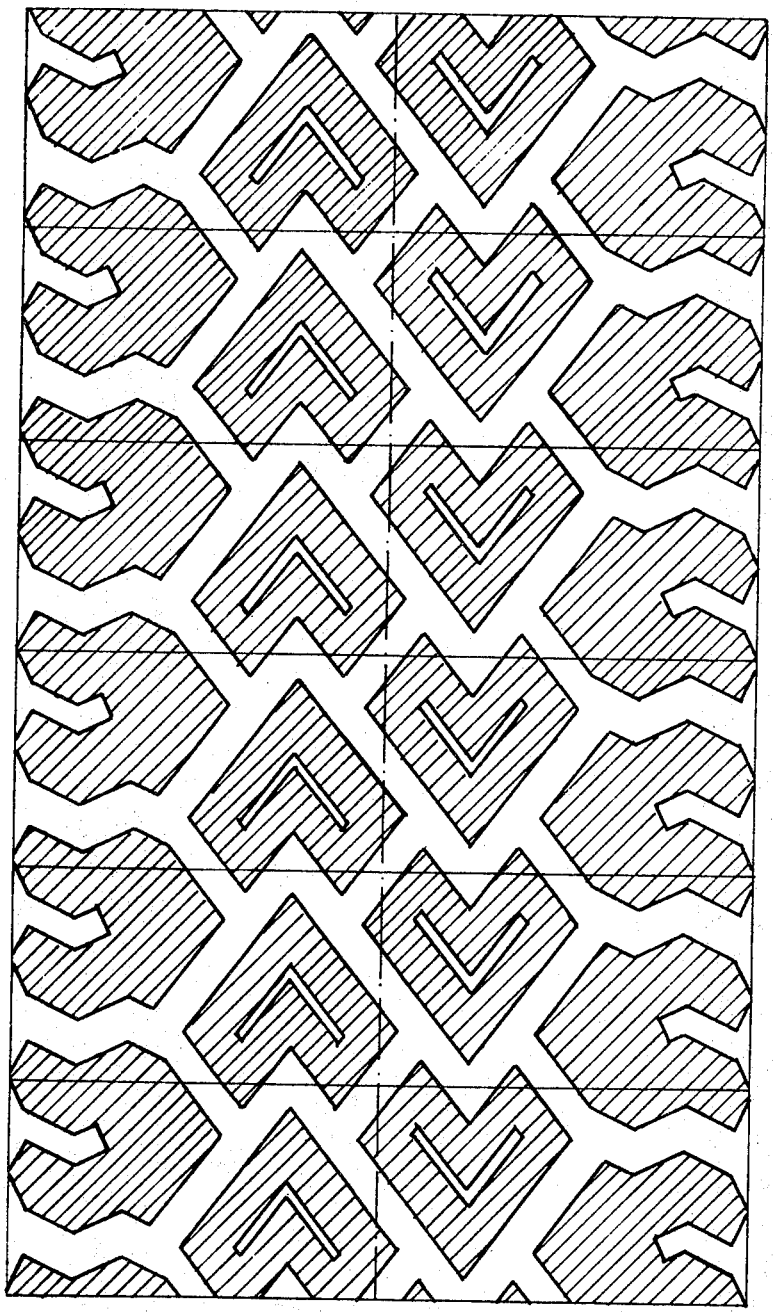
Figure 3B:
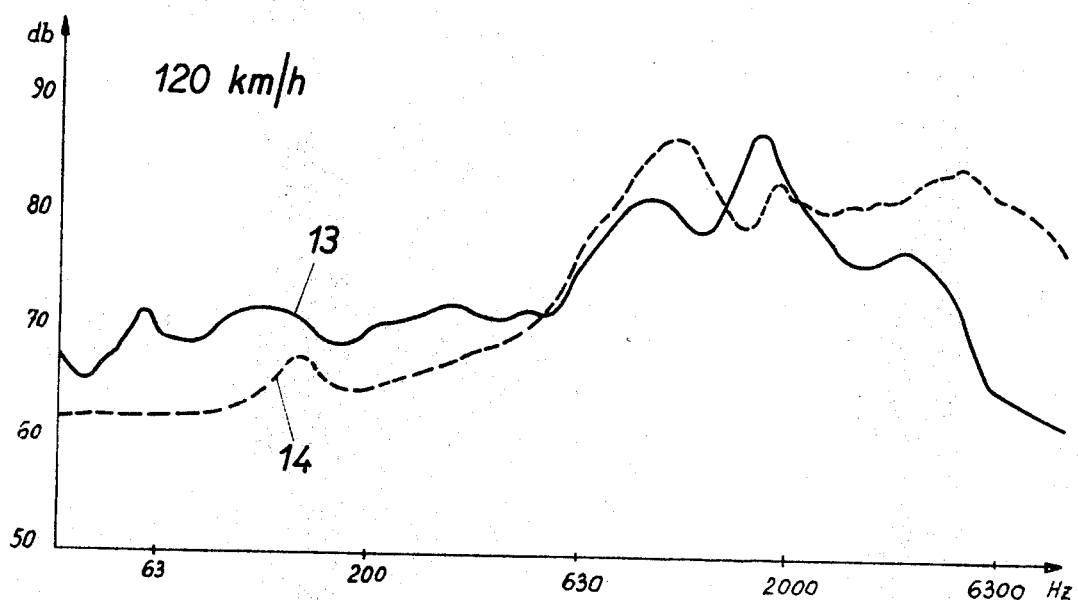

For a fuller understanding of the nature and objects of the invention, reference should be had to the following detailed description, taken in connection with the accompanying drawings, in which:

FIG. 1 is a schematic perspective view of an apparatus for analyzing tire treads in accordance with the instant invention;

FIG. 2*a* is a plan view of a graphic drawing of a tire tread design;

FIG. 2*b* is a graph showing the noise level expressed in decibels plotted over cycles per second as measured in Hertz, showing for comparison side by side a solid line curve obtained in accordance with the instant method and a broken line curve obtained by the aforesaid carving method and acoustical measuring of the same tire tread, for a speed of 70 kilometers per hour;

FIG. 2*c* is a graph similar to FIG. 2*b*, but for a speed of 120 kilometers per hour;

FIG. 3*a* is a plan view similar to FIG. 2*a*, but showing a different tire tread;

FIG. 3*b* is a graph similar to FIG. 2*c* but for the tread of FIG. 3*a*; and

Figure 3C:
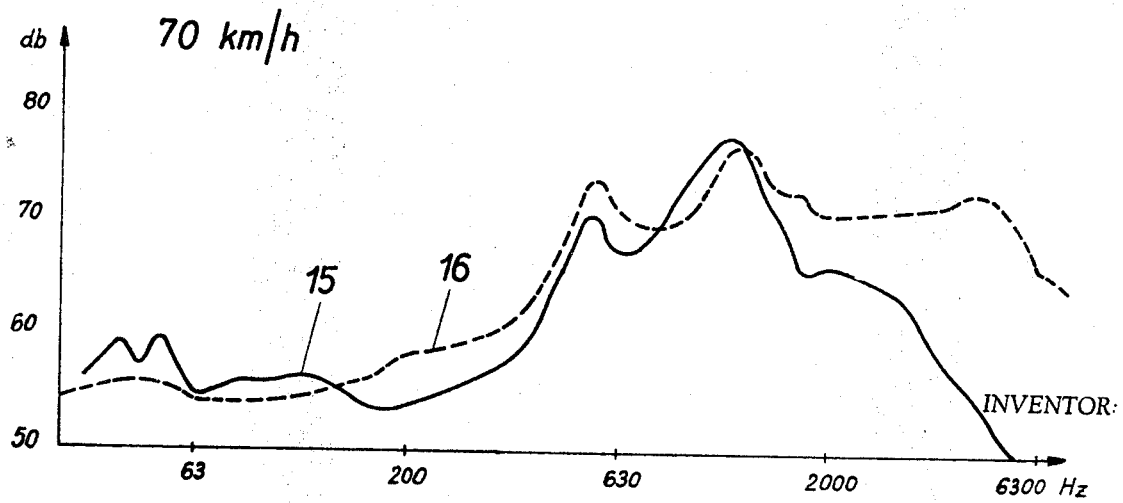

FIG. 3*c* is a graph similar to FIG. 2*b* but for the tire tread of FIG. 3*a*.

Referring now to FIG. 1, the model drawing is taken of the draft and is reproduced photomechanically and united in a tape 1 by gluing. The tape 1 is then mounted on the circumferential surface of an aluminum drum 2 that is rotatable about a central axis.

Near one point of the drum circumference there is provided a light housing 3 with a light beam, that produces with the aid of a cylindrical lens 4 a light band of high intensity on the surface of the drum 2, substantially parallel to the axis of rotation of the drum 2.

Within a reflection angle thereto, there is disposed a receiver 5 of an exploring system that has a series of photo diodes 6. Each photo diode 6 is mounted in a bore that is defined in the receiver and the cross-section of the bores may be adjusted by means of screws to equalize the sensitivity of the diodes 5. Furthermore, each of the bores may be closed by means of a plug, so that it is possible to explore merely a section of the tape 1. Moreover, each bore may be provided with a steplessly adjustable diaphragm.

The photo diode impulses are conducted to an amplifier 8 and thence to a frequency analyzer 7 and from there to a level recorder.

Due to the fixed circumference of the drum 2, it is usually not possible to mount the tape 1 without overlapping. This non-uniformity may be head in the loudspeaker, but does not influence the analysis, as the disturbance is outside the frequency spectrum within which the instant analysis proceeds.

EXAMPLE

Two different tire treads are shown in FIGS. 2a and 3a, respectively; and of each of these different tread designs there exists a drawing, for use in accordance with the instant invention, as well as a carved tire in accordance with the tire art method herein briefly described.

In FIGS. 2b, 2c, 3b and 3c there are shown comparison measurements between the two methods. As can easily be gleaned from these graphs, the comparison yields meaningful results, particularly in the interesting spectrum between 200 and 10,000 Hertz. The similarity of the curves is so striking that it demonstrates the merits of the instant method.

Minor differences can be seen in the very low and very high frequency spectra, and these differences may be due to the fact that at the instant (optical) method there do not occur any machine noises or air noises that are heard during the acoustical measuring of the prior art; on the other hand, the instant method may include net radiations from the lamp as well as humming from the amplifier; the lamp therefore must be fed direct current.

The instant optical method thus eliminates a number of side effects; thus it presents the tire tread design and its effect in a cleaner manner. Therefore the respective frequency distribution curves appear somewhat magnified, which does not need to be looked upon as any disadvantage.

In the graphs, the solid lines 9, 11, 13, and 15 represent the frequency distribution curves in accordance with the instant invention, while the broken lines 10, 12, 14, and 16 represent the frequency distribution curves of the acoustical measuring of carved tire treads in accordance with the prior art previously mentioned herein.

The lack of coincidence near the outer fringes of the frequency spectra is of minor importance, as the main influences from the model are obtained from the middle spectrum in which there occurs also the maximum sensitivity of the human ear.

The intensity of the tire background noise at the acoustical measuring increases with increasing speed, because the impact energy of the tire ribs increases with increasing speed. This effect is not easily obtained with the instant optical measuring, as the sound volume depends only on the degree of amplification. The amplification might be controlled electrically in dependence from the speed. In accordance with the experience to date, however, it is primarily the sound frequency distribution that is of importance for judging the background noise behavior of a tire tread design.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A method, for use in analyzing tire treads for contact noise, comprising the steps of disposing a model tape having a drawing of a tire tread thereon including color contrasts on a rotatable drum, rotating said drum at a predetermined angular velocity, scanning with a photoelectric exploring system said tape across its entire width, and producing electric impulses by said scanning.

2. A method, as claimed in claim 1, comprising the further step of converting said impulses into acoustical or optical signals.

3. A method, as claimed in claim 1, comprising the further step of recording said impulses.

4. An apparatus for carrying out the method of claim 1, comprising a drum rotatable about an axis, a model tape having a drawing of an actual size tire tread mounted on the circumferential surface of said drum and rotating therewith and presenting therewith an opaque surface, a photoelectric exploring system including a light source adjacent said surface of said drum, and a series of photosensitive elements aligned adjacent said tape and substantially parallel to said axis, whereby the drawing of said tire tread will be scanned.

5. An apparatus, as claimed in claim 4, said photosensitive elements including photo diodes.

6. An apparatus, as claimed in claim 5, support means for said photo diodes defining a series of bores, each bore receiving a photo diode, and a series of plugs, each operable to close a bore.

7. An apparatus, as claimed in claim 6, at least some of said bores including each a continuously adjustable diaphragm.

8. An apparatus, as claimed in claim 4, said light source including a halogen tube and a cylindrical lens between said halogen tube and said surface of the drum.

References Cited

UNITED STATES PATENTS 3,175,194   3/1965   Golay _____ 250—219

WILLIAM F. LINDQUIST, Primary Examiner

M. ABRAMSON, Assistant Examiner

U.S. Cl. X.R.

73—146, 146.5; 356—196, 244